(12) United States Patent
Fish

(10) Patent No.: US 6,187,202 B1
(45) Date of Patent: Feb. 13, 2001

(54) ELECTROLYSIS GAS TO LIFT A FILTERED LIQUID

(75) Inventor: Robert D. Fish, La Habra, CA (US)

(73) Assignee: NATE International, Woodland Hills, CA (US)

( * ) Notice: Under 35 U.S.C. 154(b), the term of this patent shall be extended for 0 days.

(21) Appl. No.: 09/296,475

(22) Filed: Apr. 22, 1999

Related U.S. Application Data

(60) Provisional application No. 60/082,906, filed on Apr. 24, 1998.

(51) Int. Cl.[7] .................................................. B01D 61/00

(52) U.S. Cl. ........................ 210/652; 210/170; 210/650; 210/767; 204/157.5

(58) Field of Search ...................................... 210/663, 650, 210/652, 170, 321.6, 321.74, 232, 321.78, 767, 416.1, 257.2; 204/157.5, 252

(56) References Cited

U.S. PATENT DOCUMENTS

| | | | |
|---|---|---|---|
| 4,040,486 | * | 8/1977 | Kirkland, Jr. ........................ 166/311 |
| 4,125,463 | * | 11/1978 | Chenoweth ......................... 210/170 |
| 4,585,532 | * | 4/1986 | Martin et al. ........................ 204/129 |
| 5,914,041 | * | 6/1999 | Chancellor et al. ................. 210/641 |
| 5,944,999 | * | 8/1999 | Chancellor et al. ................. 210/650 |
| 5,980,751 | * | 11/1999 | Chancellor et al. ................. 210/652 |
| 5,989,407 | * | 11/1999 | Andrews et al. .................... 205/626 |

* cited by examiner

*Primary Examiner*—Ana Fortuna
(74) *Attorney, Agent, or Firm*—Fish and Associates, LLP

(57) ABSTRACT

A method of purifying fluids in which a filter is disposed at sufficient depth in a channel, a fluid is electrolyzed to produce a gas, and expansion of the gas is used to raised the filtrate upwards. The methods are contemplated to be particularly useful with salty or brackish feed fluids, and in which the channel provides a head pressure equivalent to a depth of at least 100 meters, or more preferably several hundred meters. The electrolysis preferably employs a catalyst, and produces hydrogen and oxygen.

10 Claims, 1 Drawing Sheet

ELECTROLYSIS GAS TO LIFT A FILTERED LIQUID

This application claims the benefit of U.S. provisional application number 60/082,906 filed Apr. 24, 1998 which is incorporated herein by reference in its entirety.

FIELD OF THE INVENTION

The field of the invention is filtration of fluids.

BACKGROUND OF THE INVENTION

Although many different types of filtration are known, all such methods require energy to separate a filtrate from a retentate. Energy can be provided in many different forms, including centrifugal force, gravity, pump pressure, capillary action, etc.

The parameters that determine the energy demand of filtration vary among the different types of filtration. In reverse osmosis systems, for example, energy demands are proportional to the size of the particles, the concentration of the particles, and the osmotic pressure of the particles. Reverse osmosis is a process in which ions or small molecules are removed from a feed fluid by forcing the feed fluid under high pressure through a semipermeable membrane. Examples of reverse osmosis can be found in U.S. Pat. No. 5,500,113 to Hartley et al., U.S. Pat. No. 4,632,754 to Wood, and U.S. Pat. No. 5,853,599 to Hsu.

In many cases considerable amounts of energy must be spent to produce a filtrate from a feed fluid. The energy is typically provided by a pump. In the case of reverse osmosis, for example, pumps typically raise a fluid to an elevated reservoir, and the height difference between the reservoir and the membranes provides a head pressure used to force the filtrate through the membranes. Unfortunately, only about 20–33% of the fluid pumped under high pressure is filtrate, which means that much more fluid is pumped than is eventually produced as filtrate. This reduces the energy efficiency of the process.

In an alternative method of creating head pressure, a reverse osmosis system is placed deep in a fluid filled channel. The high pressure side of the semipermeable membrane contacts the fluid at a relatively high pressure corresponding to the vertical distance between the membrane and the reservoir. The low pressure side of the membrane contacts the filtrate column at a relatively low pressure corresponding to the vertical distance between the membrane and the pump. The pressure difference between the two sides of the membrane drives the reverse osmosis. A pump is needed to continually remove the filtrate in order to maintain the pressure difference.

Deep well based reverse osmosis systems provide for potentially higher energy efficiency than reservoir type systems because almost all of the fluid that requires high pressure pumping is filtrate. However, in order to recover the filtrate, the filtrate must still be pumped over a significant height (pressure) differential, which typically requires the operation of one or more submerged pumps.

Unfortunately, submerged pumps pose serious difficulties, especially when disposed at depths of several hundred meters. For example, power supply and additional wiring to control the operation of the pump must be run to each submerged pump. Casings for submerged pumps must be waterproof, which may be especially difficult when the pumps operate at depths below several hundred meters. A further problem is that when a submerged pump needs maintenance it must generally be retrieved from its operating position, and in most cases such retrieval halts operation of the system. The problem is further compounded by the need tightly mount the pump to the walls of the channel to prevent dislocation and vibration damage.

Air-lift pumps can be used to circumvent some of the problems associated with submerged pumps. The basic principle is that gas introduced at a depth has a natural tendency to rise upwards, and that the rising force tends to lift surrounding fluid upwards as well. A co-owned patent application, Ser. No. 09/014,238 filed Jan. 27, 1998, incorporated herein by reference in its entirety, describes embodiments in which an air-lift pump can be operated in conjunction with a pneumatically powered centrifugal pump to lift filtrate from a well-based reverse osmosis system. Using an air-lift pump is desirable because the introduction of air into a fluid can be performed at various depths with only minimal equipment. Another advantage of air-lift pumps is that they may require only a fraction of the space required for a mechanical pump. Still another advantage is that air-lift pumps are relatively maintenance free, having few or no moving parts.

Despite the many advantages of air-lift pumps, there are several problems. For example, in known air-lift pumps, a compressor is generally required to provide compressed air. Compressors may be relatively inefficient, and may require significant maintenance due to the use of moving parts. Moreover, the compressed air must be delivered to the point of introduction through high-pressure lines. Such lines are usually fabricated in relatively short lengths, and must be serially connected to achieve sufficient length in an underground channel. The connections and prone to leaks It is possible to generate a gas in a fluid via a chemical reaction, but that strategy merely introduces other problems. The chemicals used for gas production would usually interfere with the purity of the filtrate, or at the very least tend to cause an undesirable change in the pH or other physicochemical parameters of the filtrate. Furthermore, the gas producing reaction must be initiated and run from a remote location, which may likely allow only minimal control over the progress of the reaction.

Another possibility is electrolysis. Although it is unknown to use electrolysis to produce gas for use in an air-lift pump, it is known to conduct electrolysis at a great depth. For example, in the French patent 2,298,613 to Imbreteche, seawater is electrolyzed at a considerable depth in a submerged device to produce pressurized oxygen gas and hydrogen gas.

In summary, many methods are known to recover a filtrate using reverse osmosis. However, current recovery systems tend to require complex equipment that is relatively inefficient or needs frequent maintenance. Surprisingly, despite numerous recovery systems for filtrate in reverse osmosis in a deep channel, there is no system that allows relatively simple and efficient recovery of filtrate from reverse osmosis. Therefore, there is still a need for methods and apparatus that resolve these problems.

SUMMARY OF THE INVENTION

The present invention is directed to methods of filtering a fluid in which the filtrate is raised from a production site at least in significant part using a gas generated by electrolysis.

In a preferred aspect filtering is accomplished by reverse osmosis, and in a more preferred aspect, the reverse osmosis filter system is situated deep in a fluid filled channel. The fluid being purified is preferably provided by a body of water, such as an ocean, a lake, a river, or a polluted water table, and the filtrate is preferably drinkable water.

In another preferred aspect the electrolysis is performed using a catalyst, especially a catalyst included in one of the electrodes. In an even more preferred aspect, one of the electrodes is a platinum coated cathode.

In yet a further preferred aspect of the invention, multiple electrodes are positioned at various depths between 50 and 500 meters.

Various objects, features, aspects and advantages of the present invention will become more apparent from the following detailed description of preferred embodiments of the invention, along with the accompanying drawings in which like numerals represent like components.

DETAILED DESCRIPTION

Figure 1:
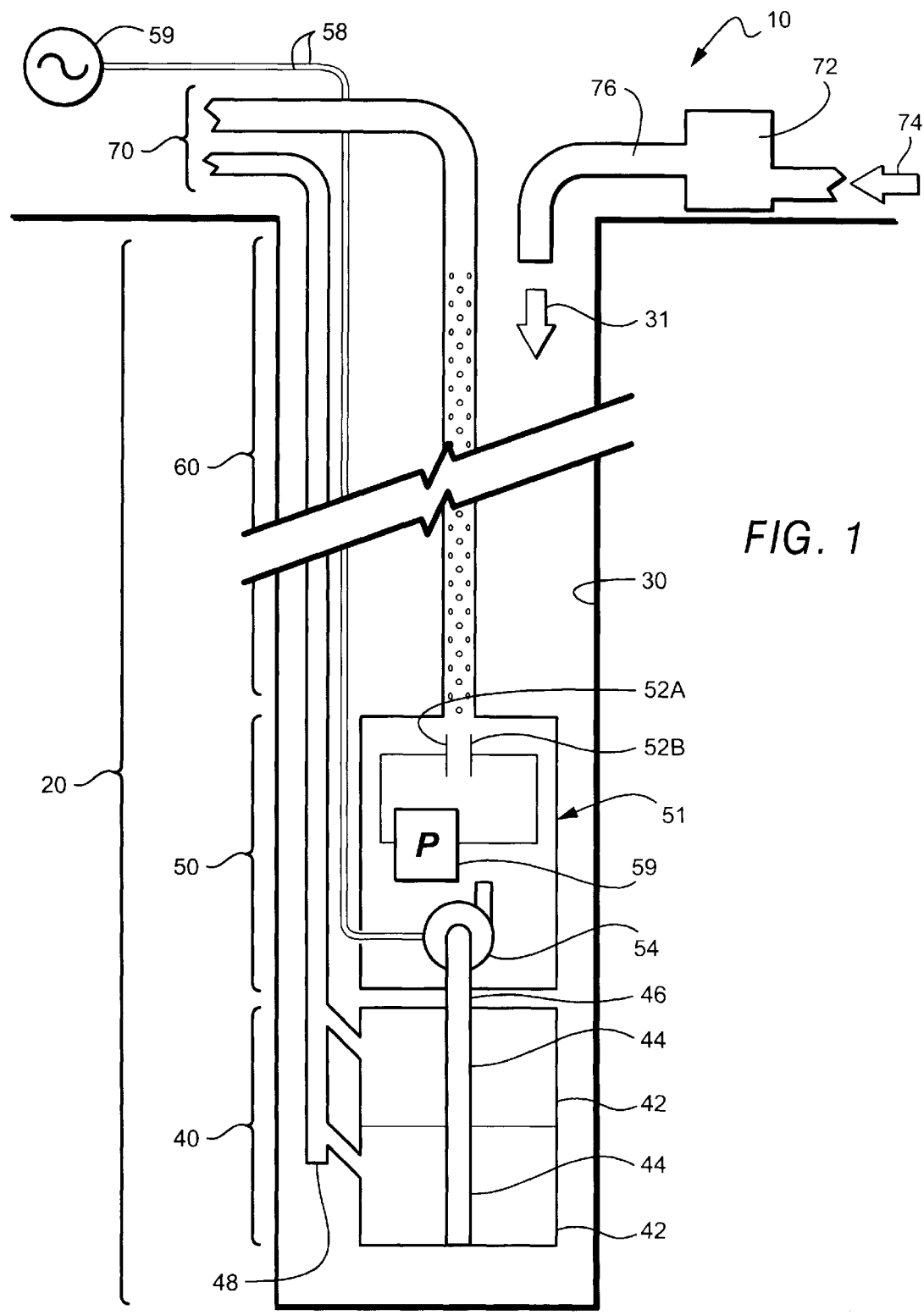
FIG. 1 is a schematic of an electrolysis driven air-lift pump in a reverse osmosis filtration system.

In FIG. 1 a reverse osmosis filtration system 10 generally comprises a deep channel 20, a shaft casing 30, a filtration portion 40, an electrolysis portion 50, a riser portion 60, and a multiport portion 70.

Channel 20 is any elongated, substantially delimited conduit that has sufficient dimensions to house a reverse osmosis membrane, three flowpaths (feed fluid, filtrate and waste fluid flowpaths), as well as electrolysis electrodes and power cables. As used herein the term "deep channel" refers to a channel providing a head pressure equivalent to at least 100 meters, although preferred channels provide a head pressure equivalent to at least 200 meters, more preferably at least 300 meters, and even more preferably at least 400 meters. Abandoned water or oil wells may be used as channels, and alternatively a channel can be drilled de novo for the purpose of building a filtration system. In all of these instances it is desirable for the channel to be at least a few hundred meters deep, and have a usable inner diameter of at least 6 inches, although channels having smaller diameters can also be used.

A channel according to the present invention will generally be located near the ocean, or other salty or brackish body of water, to provide a convenient source of water. In such cases the channel preferably descends from a point in the body of water or from a point on the land. In other instances an appropriate channel may be utilized which is many miles from a source of water. Appropriate channels may even be inclined rather than vertically oriented, and may be raised above ground rather than disposed below ground. In short, systems as herein described may be utilized in conjunction with many different types of channels, regardless of their original purpose, shape, orientation, and location.

In a preferred embodiment, feed shaft casing 30 is a round steel casing with a wall strength of about 1 cm. However, it is apparent that many other alternative casings known in the art may be used, including other metals, or pressure resistant synthetic polymers. Examples are copper, brass and aluminum casings. In general, the exact nature of the casing 30 is not especially important, and suitable channels may have no casing at all. When present, shaft casing 30 preferably defines a feed fluid flowpath 31, and encloses the filtration portion 40, and the electrolysis portion 50.

The filtration portion 40 generally comprises a plurality of modular filter units 42, which feed a filtrate flowpath 44 and a waste discharge flowpath 48. The filters in filter units 42 may advantageously comprise a reverse osmosis membrane (not shown). Examples of both filter units and membranes are provided in US patent application Ser. Nos. 08/925,055, 08/919,293, and PCT applications PCT/US97/15181 and PCT/US99/04058.

The electrolysis portion 50 generally includes a filtrate accumulation chamber 51, a cathode 52A and anode 52B, an electric pump 54, and a power converter 59. Power lines 58 transmit electric power to the electrodes 52A, 52B and the electric pump 54 from power source 59.

The multiport portion 70 is preferably located above ground, and generally includes a feed fluid pump 72 that pumps feed fluid from a reservoir or other feed fluid source 74 through feed fluid piping 76, and into feed fluid flowpath 31. In a preferred embodiment, the feed fluid source 74 is a well that contains run-off water from a land fill. Numerous other feed fluid sources are contemplated, however, which need not have confining walls, and which may vary considerably in size and volume. For example, a feed fluid source without confining walls could be a river, a lake, an ocean, or a reservoir. Exemplary feed fluid sources with confining walls are large tanks and pipelines.

With respect to cathode 52A and anode 52B, a preferred configuration is two single platinum coated, plate-shaped copper electrodes with dimensions of approximately 25 cm×25 cm×5 mm (length by height by thickness). The cathode 52A and anode 52B are preferably approximately 1 cm apart, and both electrodes are fixed to the filtrate accumulation chamber 51 via a ceramic insulator and metal screws. However, there are numerous other configurations of the cathode 52A and the anode 52B with regard to their material, shape, number, arrangement, and connection to the filtrate accumulation chamber 51.

It is contemplated that electrolysis of a fluid may also be performed using more than one cathode and more than one anode. It is further contemplated that the number of cathodes need not be the same as the number of anodes. The number of cathodes and anodes may indeed vary greatly between alternative embodiments, so long as they permit relatively efficient electrolysis of the fluid. For example, electrolysis may be performed using ten cathodes and five anodes. In other alternative embodiments, twenty cathodes and twenty anodes may be used to perform electrolysis.

Although preferred electrodes are platinum plated copper electrodes, alternative electrodes may be made from many other materials, including pure metals, metal mixtures and alloys. For example, appropriate metals include silver, iron, platinum, and gold. Metal mixtures for alternative electrodes include stainless steel or hardened steel and alloy for alternative electrodes are, for example brass or nickel-plated brass. Preferred electrodes are plated with platinum, however, many other plating materials are practicable so long as the plating is conductive. Alternative platings may include palladium, copper, silver, and so forth.

Appropriate electrodes need not be plate-shaped, and need not have dimensions as given above. Other potentially suitable shapes include rods, disks, spirals, wires, etc. For example, rod-shaped electrodes may be less than 1 cm in diameter and 25 cm long, but also may also have a rectangular profile and be relatively short, e.g. 0.5 cm×1 cm×10 cm. Disk shaped electrodes may include solid disks of different strength, diameter or shape, for example, 5 cm round disks of about 2 mm thickness, or 20 cm round disks of about 2 cm thickness, or ellipsoid disks of between 20 cm and 40 cm radius and 5 mm strength. Spiral shaped electrodes may have various configurations including large, round spirals, following closely the shape of the inside wall of filtrate accumulation chamber 51, or small spirals with a diameter of less than an inch. Alternative electrodes need not be plate-shaped at all, but may also be single or multiple wires, which may be oriented in one or more directions. For example, the wires could form a horizontal grid across the filtrate accumulation chamber, but could also be vertically oriented along side the walls of the filtrate accumulation chamber.

Electrodes are contemplated to be spaced from each other at whatever distance is practicable, given the composition of the fluid being filtered, the dimensions of the electrodes, and so forth. Spacing of less than 1 cm is specifically contemplated, as is spacing of more than 2 cm.

In preferred embodiments the electrodes 42A, 52B are fixed to the filtrate accumulation chamber 51 using a ceramic insulator and metal screws, however various other means of immobilization of the electrodes are contemplated. Alternative ways of coupling the electrodes include permanent connections as well as removable connections. Permanent connections may be made in many ways including welding, soldering, bolts, rivets, and so on. Removable connections may include mechanical or electromechanical connections. For example, spring- or pneumatically operated lock mechanisms, male-female-type locks, external threads, clamps, and hooks can all be employed to provide removable mechanical connections. Electromagnets or electromagnetically operated lock mechanisms can also be employed to provide removable electromechanical connections.

Platinum, nickel, and other catalysts are known in the art for electrolyzing fluids, and all such catalysts are contemplated herein. Catalysts are usually coated upon one or more of the electrodes 52A, 52B, although it is also contemplated that catalysts may be disposed in various other places, including being dissolved within the filtrate. For example, an appropriate catalyst may comprise a suspension of palladium on activated charcoal. It is also contemplated that multiple catalysts may be employed.

Power lines 58 are preferable plastic insulated copper wires having outside diameter of approximately 2 cm, capable of delivering currents of about 40 amperes. Preferred power lines are run to the electrodes along the inside of shaft casing 30, and are attached to the shaft casing by wall mount brackets (not shown). In alternative embodiments the power lines may be made from many other materials than copper (copper alloys, iron wire, aluminum, and so forth), may have other forms than a round wire, and may deliver currents of more or less than 40 amperes. Alternative power lines may be insulated with any suitable insulator, including synthetic plastics, ceramics, and rubber. Insulators fabricated from polyvinyl chloride, polyester, or vulcanized synthetic rubber are especially contemplated.

Power lines 58 preferably run along the inside of shaft casing 30, but may alternatively run outside of the shaft casing, or within a dedicated sheath within or outside the shaft casing. In other examples, separate power lines for the electrodes may be run separately along the shaft casing 30. In still other examples, the power lines are contemplated to run alongside the waste discharge line 48 or the filtrate harvest line 46. Attachment of power lines to the shaft casing may be accomplished using wall mount brackets, clamps, hooks, screws, glue, or any other suitable apparatus.

The power converter 59 is preferably an industrial AC→DC transformer/rectifier providing an output of approximately 6V DC at 40 amperes. In alternative embodiments the power source may also include a battery or capacitor. Depending on the nature of the fluid being electrolyzed, the potential or current may vary considerably. For example, fluids with a higher conductivity may require lower voltages, whereas highly purified water may require significantly higher voltages.

Filter units 42 preferably include reverse osmosis membranes, suitable for deionizing salty or brackish water. Where a semipermeable membrane is utilized, the membrane need not be selective for ions, but may also be selective to many other compounds including ethanol, glucose, and phosphate. In alternative embodiments various other filter units may be used, including any suitable macrofiltration, microfiltration, or ultrafiltration units.

Pump 52 is contemplated to aid in pumping, or at times to effect all of the pumping without any reliance on the air lift pump. Pump 52 is preferably a multi-stage, positive pressure, submersible pump, operating at 6 or 12 Volts. Additional details of the pump 52 are not given herein because such pumps are widely known, and all suitable pumps are contemplated. As can now be appreciated, one advantage of using electrolysis as a means of producing gas for an air-lift pump is that it requires only a minimal technical setup. The only parts required are power lines to deliver electricity to the electrodes, and electrodes to electrolyze the fluid. Moving parts or complex equipment are thus not required, although in preferred embodiments conventional pumps are typically also included.

The flow paths can be modified from that shown in any viable manner. For example, instead of feed fluid flowing downward in an open portion of the system as shown by arrow 31, the feed fluid may be supplied to the filtration units 42 via an enclosed pipe. Similarly, instead of waste fluid being carried from the filter units 42 using a dedicated waste fluid line 48, the waste fluid may be deposited directly into the open space 31, and removed from the system using a short pipe near the surface.

Thus, specific embodiments and applications of electrolysis driven air-lift pumps have been disclosed. It should be apparent, however, to those skilled in the art that many more modifications besides those already described are possible without departing from the inventive concepts herein. For example, the feed fluid need not be restricted to water, wastewater or seawater. Many other alternative fluids are also appropriate, including beverages, food fluids or non-aqueous fluids, for example, wines, soups and oils. In other embodiments the submersible pump may be eliminated altogether, relying entirely on the air-lift pump to raise the filtrate to the surface. It should also be appreciated that electrolysis can be performed on any fluid in the system, not just the filtrate. For example, electrolysis may be performed on a salt water feed fluid, and the gas produced by the electrolysis may be used to lift a filtrate of substantially salt-free water. Also, use of the electrolysis-produced gas "to lift the filtrate upwards" does not necessarily mean directly upwards. In the case of a channel disposed off-vertical, the electrolysis-produced gas would technically lift the filtrate both upwards and sideways.

The inventive subject matter, therefore, is not to be restricted except in the spirit of the appended claims.

What is claimed is:

1. A method of purifying a fluid comprising:
   providing a deep channel;
   situating a filter at a first depth in the channel, the filter producing a filtrate from a feed fluid;

providing a filtrate accumulation chamber with a plurality of electrodes at a second depth, wherein the filtrate accumulation chamber receives the filtrate from the filter, and wherein the filtrate accumulation chamber is fluidly coupled to a pump;

providing a sufficient voltage across the plurality of electrodes to at least partially electrolyze a fluid to produce a gas; and raising the filtrate upwards using the pump and the gas to generate a rising force.

2. The method of claim 1, wherein the filtrate comprises water.

3. The method of claim 2, wherein the feed fluid is selected from the group consisting of waste water, seawater, brackish water, and polluted freshwater.

4. The method of claim 1, wherein the second depth is at least 100 meters.

5. The method of claim 1, wherein the second depth is at least 200 meters.

6. The method of claim 1, wherein the filter comprises a reverse osmosis membrane.

7. The method of claim 1, wherein the filtrate comprises deionized water.

8. The method of claim 1, wherein a catalyst is coupled to at least one of the electrodes.

9. The method of claim 1, wherein at least one of the electrodes comprises platinum.

10. The method of claim 1, wherein the gas comprises oxygen or hydrogen.

* * * * *